US012166715B2

(12) United States Patent
Lin et al.

(10) Patent No.: US 12,166,715 B2
(45) Date of Patent: Dec. 10, 2024

(54) SYSTEMS AND METHODS FOR RADIO OPERATION WITH REDUCED BANDWIDTH

(71) Applicant: TELEFONAKTIEBOLAGET LM ERICSSON (PUBL), Stockholm (SE)

(72) Inventors: Xingqin Lin, Santa Clara, CA (US); Stefan Parkvall, Bromma (SE); Yi-Pin Eric Wang, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 283 days.

(21) Appl. No.: 17/442,773

(22) PCT Filed: Mar. 26, 2020

(86) PCT No.: PCT/IB2020/052882
§ 371 (c)(1),
(2) Date: Sep. 24, 2021

(87) PCT Pub. No.: WO2020/194240
PCT Pub. Date: Oct. 1, 2020

(65) Prior Publication Data
US 2022/0166569 A1 May 26, 2022

Related U.S. Application Data

(60) Provisional application No. 62/823,936, filed on Mar. 26, 2019.

(51) Int. Cl.
*H04W 56/00* (2009.01)
*H04L 5/00* (2006.01)

(52) U.S. Cl.
CPC ............ *H04L 5/005* (2013.01); *H04L 5/0051* (2013.01); *H04L 5/0053* (2013.01)

(58) Field of Classification Search
CPC ........ H04J 11/0086; H04L 5/00; H04L 5/005; H04L 5/0051; H04L 5/0053;
(Continued)

(56) References Cited

U.S. PATENT DOCUMENTS 10,462,761 B2 * 10/2019 Li ....................... H04W 56/001
10,477,499 B2 * 11/2019 Wang ................... H04L 5/0051
(Continued)

FOREIGN PATENT DOCUMENTS

WO 20180145081 A1 8/2018

OTHER PUBLICATIONS

3GPP TS 38.211 V15.4.0 (Dec. 2018), "3rd Generation Partnership Project; Technical Specification Group Radio Access Network; NR; Physical channels and modulation (Release 15)".
(Continued)

*Primary Examiner* — Frank Duong
(74) *Attorney, Agent, or Firm* — Weisberg I.P. Law, P.A.

(57) ABSTRACT

A network node configured to, and/or comprising a radio interface and/or comprising processing circuitry configured to transmit a synchronization block mapped to four OFDM symbols in the time domain and 144 contiguous subcarriers in the frequency domain is provided. Optionally, a first of the four OFDM symbol is used by a primary synchronization signal, PSS. Optionally, a third of the four OFDM symbols is used by a secondary synchronization signal, SSS. Optionally, a second and a fourth of the OFDM symbols are used by a Physical Broadcast Channel, PBCH, in 12 contiguous resource blocks, RBs. Optionally, within each of the resource block RB in an OFDM symbol used by PBCH, there are 12 resource elements, and, optionally, 3 of the 12 resource elements are used for a downlink modulation reference signal, DMRS.

3 Claims, 14 Drawing Sheets

(58) Field of Classification Search
CPC .......... H04L 27/2602; H04L 27/26025; H04L 27/2613; H04L 27/2655; H04L 27/2657; H04L 27/2662; H04W 16/14; H04W 56/001
See application file for complete search history.

(56) References Cited

U.S. PATENT DOCUMENTS

| | | | |
|---|---|---|---|
| 10,616,019 B2* | 4/2020 | Wu | H04L 5/0041 |
| 11,070,412 B2* | 7/2021 | Si | H04J 11/0073 |
| 11,240,081 B2* | 2/2022 | Noh | H04L 5/0091 |
| 11,304,181 B2* | 4/2022 | Choi | H04L 5/0005 |
| 11,381,369 B2* | 7/2022 | Choi | H04W 76/27 |
| 11,412,507 B2* | 8/2022 | Choi | H04W 72/0446 |
| 11,729,748 B2* | 8/2023 | Choi | H04L 5/1469 370/330 |
| 2018/0368084 A1 | 12/2018 | Ko et al. | |
| 2020/0053781 A1* | 2/2020 | Pan | H04W 72/30 |

OTHER PUBLICATIONS

3GPP, "3rd Generation Partnership Project; Technical Specification Group Radio Access Network; NR; Physical layer procedures for control (Release 15)", TS 38.213 V15.4.0, Dec. 2018, pp. 1-104.
R1-1718180—"Discussion on remaining details on NR-PBCH and PBCH-DMRS" 3GPP, Mobile competence centre; 650, Route des Lucioles; F-06921 Sophia-Antipolis Cedex, France.
Martinez, Murcia J., "International Search Report", PCT/IB2020/052882, EPO, Netherlands, May 27, 2021.

* cited by examiner

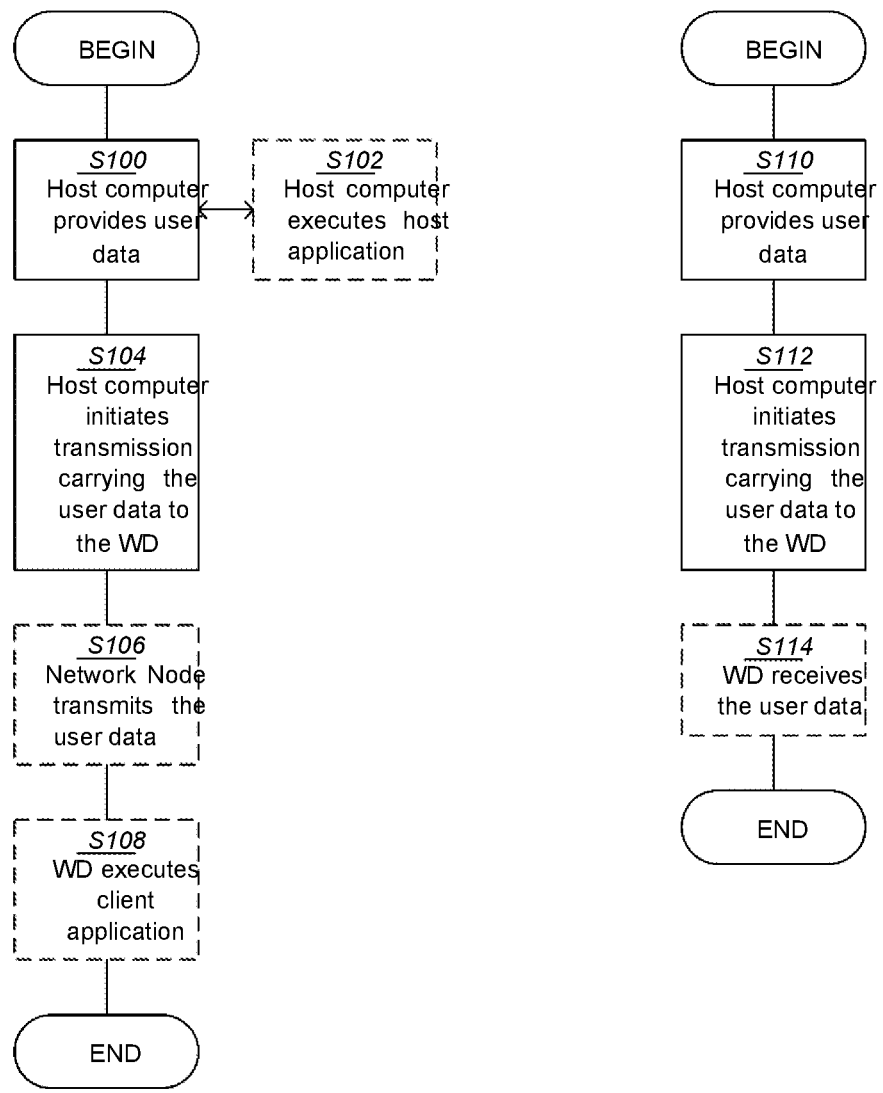

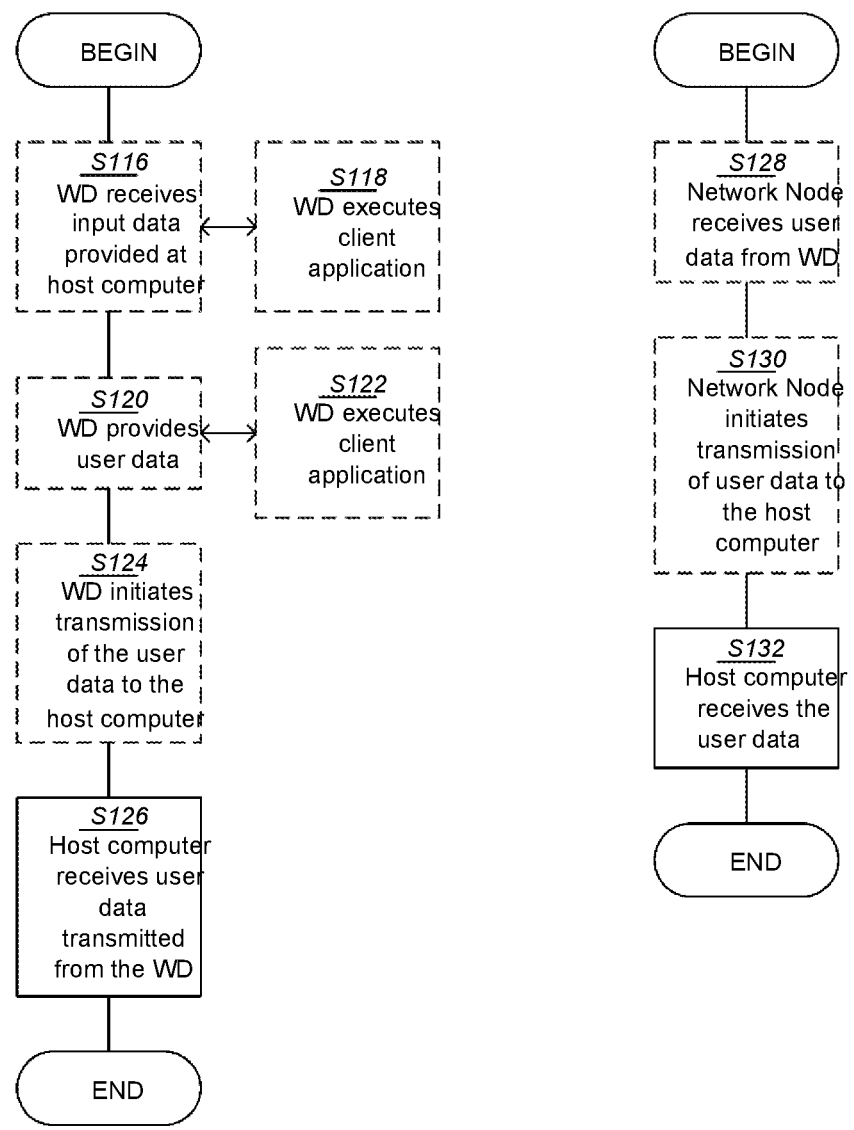

SYSTEMS AND METHODS FOR RADIO OPERATION WITH REDUCED BANDWIDTH

RELATED APPLICATIONS

This application claims the benefit of provisional patent application Ser. No. 62/823,936 filed Mar. 26, 2019, the disclosure of which is hereby incorporated herein by reference in its entirety.

TECHNICAL FIELD

The technology of the disclosure relates to wireless communications, and in particular, to methods and devices for radio operation with reduced bandwidth.

BACKGROUND

The 5th generation (5G) wireless access technology, known as new radio (NR), features spectrum flexibility, ultra-lean design, forward compatibility, low latency support, and advanced antenna technologies. Built on the first release of NR (Release 15), the evolution of NR will bring additional capabilities to provide better performance and address new application areas. One new direction is to support UEs with reduced complexity that are essential for IOT type applications.

Reducing UE bandwidth is an important aspect towards UE complexity reduction. The existing NR design poses some limits on how small UE bandwidth can be in order to function in an NR system.

SSB, the combination of synchronization signals and physical broadcast channel (PBCH), is used by UE to obtain the physical cell identity, achieve downlink synchronization, and acquire master information block (MIB). The MIB transmitted on the PBCH contains a small amount of information, necessary for the UE in order to receive the remaining system information in the SIBs. Among other pieces of information, the MIB contains configuration of CORESET #0, the control resource set with index 0, and SS #0, the search space set with index 0. An SSB is mapped to 4 OFDM symbols in the time domain and 240 contiguous subcarriers (20 RBs) in the frequency domain [1]. The subcarrier spacing of SSB can be 15 or 30 kHz in FR1 (frequency range 1) and 120 kHz or 240 kHz in FR2 (frequency range 2). Accordingly, the bandwidth of SSB is 3.6 MHz or 7.2 MHz in FR1 and 28.8 MHz or 57.6 MHz in FR2.

CORESET #0 and SS #0 are used to transmit physical downlink control channel (PDCCH) scheduling physical downlink shared channel (PDSCH) that carries system information block 1 (SIB1) [2]. The smallest possible CORESET #0 size in the frequency domain is 24 RBs which means that in standalone NR deployment it is not possible to support bandwidths smaller than this, despite that the SSB occupies 20 RBs. The subcarrier spacing of CORESET #0 can be 15 or 30 kHz in FR1 and 60 kHz or 120 kHz in FR2. Accordingly, the bandwidth of CORESET #0 is 4.32 MHz or 8.64 MHz in FR1 and 17.28 MHz or 34.56 MHz in FR2.

References [3]-[5] provide additional details on the New Radio operation and structures.

SUMMARY

Some embodiments advantageously provide methods, systems, and apparatuses for radio operation using one or more of:

an SSB structure with 12-RB bandwidth;
an SSB configuration with 2 structures;
PDCCH transmission and reception in CORESET #0 of at least 24 RBs for carrier or UE with bandwidth less than 24 RBs, for example by restricting the valid PDCCH candidates to the subset of PDCCH candidates that are fully contained in the carrier or UE bandwidth;
a CORESET #0 message with bandwidth smaller than the bandwidth of the existent CORESET #0 message.

A bandwidth operation transmitter at a network node and a bandwidth operation receiver at a UE are operable to use one or more of the above structures.

The radio operation according to certain embodiments may support support UEs with reduced bandwidths. Some proposed embodiments may also allow an radio carrier, e.g. an NR carrier, to be deployed in a smaller spectrum allocation.

In one embodiment, a network node comprising a bandwidth operation transmitter configured to transmit one or more of several messages with structures that allow reduced bandwidth radio operation is provided.

In one embodiment, a network node configured to, and/or comprising a radio interface and/or comprising processing circuitry configured to transmit a synchronization block mapped to four OFDM symbols in the time domain and 144 contiguous subcarriers (12 RBs) in the frequency domain is provided. Optionally, a first of the four OFDM symbol is used by a primary synchronization signal, PSS. Optionally, a third of the four OFDM symbols is used by a secondary synchronization signal, SSS. Optionally, a second and a fourth of the OFDM symbols are used by a Physical Broadcast Channel, PBCH, in 12 contiguous resource blocks, RBs. Optionally, within each of the resource block RB in an OFDM symbol used by PBCH, there are 12 resource elements, and, optionally, 3 of the 12 resource elements are used for a downlink modulation reference signal, DMRS.

In one embodiment, a network node configured to, and/or comprising a radio interface and/or comprising processing circuitry configured to transmit a master information block, MIB, using two different structures (A and B), both structures occupying the same bandwidth as a PBCH and occupying different time occasions, for example in two (subsequent) SSB occasions, is provided.

In one embodiment, a network node configured to, and/or comprising a radio interface and/or comprising processing circuitry configured to, at least one of: transmitting a CORESET #0 of a bandwidth of 24, 48, or 96 RBs for a NR carrier bandwidth or a UE bandwidth B less than 24 RBs, determining PDCCH candidates in a search space associated with CORESET #0 according to a legacy NR design and determining as invalid, and, optionally not transmitting, a PDCCH candidate that is not fully contained within the bandwidth B, is provided.

In one embodiment, a network node, configured to, and/or comprising a radio interface and/or comprising processing circuitry configured to perform at least one of: transmitting a CORESET #0 structure with a bandwidth chosen from 12 RBs, 16 RBs, or 18 RBs, wherein, optionally, the CORESET duration in time may be extended to include values such as 4, 6, 8, 9, 12, and 14 symbols, and monitoring PDCCH candidates with a lower aggregation level are monitored in a search space SS #0 associated with a CORESET #0, wherein, optionally, a lower aggregation level may include 2 and/or 1, is provided.

In one embodiment, a method for a network node comprising transmitting one or more of several messages with structures that allow reduced bandwidth radio operation is provided.

In one embodiment, a method for a network node comprising transmitting a synchronization block mapped to four OFDM symbols in the time domain and 144 contiguous subcarriers (12 RBs) in the frequency domain, is provide. Optionally, a first of the four OFDM symbol is used by a primary synchronization signal, PSS. Optionally, a third of the four OFDM symbols is used by a secondary synchronization signal, SSS. Optionally, a second and a fourth of the OFDM symbols are used by a Physical Broadcast Channel, PBCH, in 12 contiguous resource blocks, RBs. Optionally, within each of the resource block RB in an OFDM symbol used by PBCH, there are 12 resource elements, and, optionally, 3 of the 12 resource elements are used for a downlink modulation reference signal, DMRS.

In one embodiment, a method for a network node comprising transmitting a master information block, MIB, using two different structures (A and B), both structures occupying the same bandwidth as a PBCH and occupying different time occasions, for example in two (subsequent) SSB occasions, is provided.

In one embodiment, a method for a network node comprising at least one of transmitting a CORESET #0 of a bandwidth of 24, 48, or 96 RBs for a NR carrier bandwidth or a UE bandwidth B less than 24 RBs, determining PDCCH candidates in a search space associated with CORESET #0 according to a legacy NR design, transmitting a CORESET #0 of a bandwidth of 24, 48, or 96 RBs for a NR carrier bandwidth or a UE bandwidth less than 24 RBs, B, determining PDCCH candidates in a search space associated with CORESET #0 according to a legacy NR design and determining as invalid, and, optionally not transmitting, a PDCCH candidate that is not fully contained within the bandwidth B, is provided.

In one embodiment, a method for a network node comprising at least one of transmit a CORESET #0 structure with a bandwidth chosen from 12 RBs, 16 RBs, or 18 RBs, wherein, optionally, the CORESET duration in time may be extended to include values such as 4, 6, 8, 9, 12, and 14 symbols, transmit a CORESET #0 structure with a bandwidth chosen from 12 RBs, 16 RBs, or 18 RBs, wherein, optionally, the CORESET duration in time may be extended to include values such as 4, 6, 8, 9, 12, and 14 symbols, and monitor PDCCH candidates with a lower aggregation level are monitored in a search space SS #0 associated with a CORESET #0, wherein, optionally, a lower aggregation level may include 2 and/or 1, is provided.

In one embodiment, a wireless device, comprising a bandwidth operation receiver configured to receive one or more of several messages with structures that allow reduced bandwidth radio operation, is provided.

In one embodiment, a wireless device, configured to, and/or comprising a radio interface and/or comprising processing circuitry configured to receive a synchronization block mapped to four OFDM symbols in the time domain and 144 contiguous subcarriers (12 RBs) in the frequency domain, wherein: optionally, a first of the four OFDM symbol is used by a primary synchronization signal, PSS, optionally, a third of the four OFDM symbols is used by a secondary synchronization signal, SSS, optionally, a second and a fourth of the OFDM symbols are used by a Physical Broadcast Channel, PBCH, in 12 contiguous resource blocks, RBs, wherein, optionally, within each of the resource block RB in an OFDM symbol used by PBCH, there are 12 resource elements, and, optionally, 3 of the 12 resource elements are used for a downlink modulation reference signal, DMRS.

In one embodiment, a wireless device, configured to, and/or comprising a radio interface and/or comprising processing circuitry configured to receive a master information block, MIB, using two different structures (A and B), both structures occupying the same bandwidth as a PBCH and occupying different time occasions, for example in two (subsequent) SSB occasions, is provided.

In one embodiment, a wireless device, configured to, and/or comprising a radio interface and/or comprising processing circuitry configured to, at least one of: receiving a CORESET #0 of a bandwidth of 24, 48, or 96 RBs for a NR carrier bandwidth or a UE bandwidth B less than 24 RBs, determining PDCCH candidates in a search space associated with CORESET #0 according to a legacy NR design, determining as invalid, and, optionally not receive ting, a PDCCH candidate that is not fully contained within the bandwidth B, is provided.

In one embodiment, a wireless device, configured to, and/or comprising a radio interface and/or comprising processing circuitry configured to, at least one of: receive a CORESET #0 structure with a bandwidth chosen from 12 RBs, 16 RBs, or 18 RBs, wherein, optionally, the CORESET duration in time may be extended to include values such as 4, 6, 8, 9, 12, and 14 symbols and monitor PDCCH candidates with a lower aggregation level are monitored in a search space SS #0 associated with a CORESET #0, wherein, optionally, a lower aggregation level may include 2 and/or 1, is provided.

In one embodiment, a method for a wireless device comprising receiving one or more of several messages with structures that allow reduced bandwidth radio operation, is provided.

In one embodiment, a method for a wireless device comprising receiving a synchronization block mapped to four OFDM symbols in the time domain and 144 contiguous subcarriers (12 RBs) in the frequency domain, wherein optionally, a first of the four OFDM symbol is used by a primary synchronization signal, PSS, optionally, a third of the four OFDM symbols is used by a secondary synchronization signal, SSS, optionally, a second and a fourth of the OFDM symbols are used by a Physical Broadcast Channel, PBCH, in 12 contiguous resource blocks, RBs, wherein, optionally, within each of the resource block RB in an OFDM symbol used by PBCH, there are 12 resource elements, and, optionally, 3 of the 12 resource elements are used for a downlink modulation reference signal, DMRS, is provided.

In one embodiment, a method for a wireless device comprising receiving a master information block, MIB, using two different structures (A and B), both structures occupying the same bandwidth as a PBCH and occupying different time occasions, for example in two (subsequent) SSB occasions, is provided.

In one embodiment, an method for a wireless device comprising at least one of: receiving a CORESET #0 of a bandwidth of 24, 48, or 96 RBs for a NR carrier bandwidth or a UE bandwidth B less than 24 RBs, B, determining PDCCH candidates in a search space associated with CORESET #0 according to a legacy NR design, and determining as invalid, and, optionally not receiving, a PDCCH candidate that is not fully contained within the bandwidth B, is provided.

In one embodiment, a method for a wireless device comprising at least one of transmitting a CORESET #0 structure with a bandwidth chosen from 12 RBs, 16 RBs, or 18 RBs, wherein, optionally, the CORESET duration in time may be extended to include values such as 4, 6, 8, 9, 12, and 14 symbols, and monitoring PDCCH candidates with a lower aggregation level are monitored in a search space SS #0 associated with a CORESET #0, wherein, optionally, a lower aggregation level may include 2 and/or 1, is provided.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3-6 is a flowchart illustrating exemplary methods implemented in a communication system including a host computer, a network node and a wireless device for receiving user data at a host computer according to some embodiments of the present disclosure;

DETAILED DESCRIPTION

Figure 1:
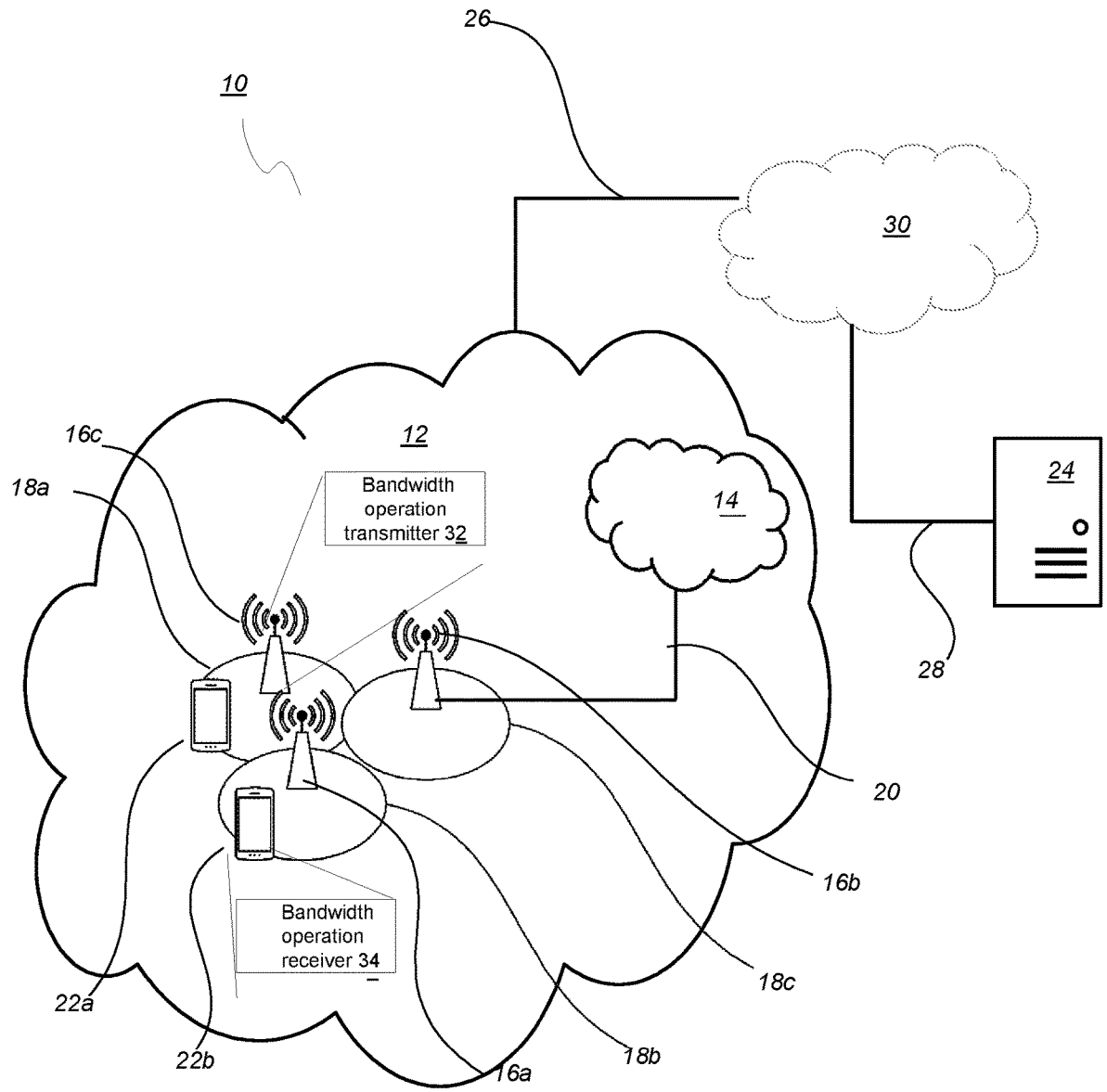
FIG. 1 is a schematic diagram of an exemplary network architecture illustrating a communication system connected via an intermediate network to a host computer according to the principles in the present disclosure.

Before describing in detail exemplary embodiments, it is noted that the embodiments reside primarily in combinations of apparatus components and processing steps related to a set of methods, systems and apparatuses that enable NR operation to support UE with reduced bandwidths. Certain embodiments use on or more signals, for example: an SSB structure with 12-RB bandwidth; and/or an SSB configuration with 2 structures; and/or a PDCCH transmission and reception in CORESET #0 of at least 24 RBs for carrier or UE with bandwidth less than 24 RBs by restricting the valid PDCCH candidates to the subset of PDCCH candidates that are fully (entirely) contained in the carrier or UE bandwidth; and/or a CORESET #0 signal with reduced bandwidths.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein.

As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), (IAB) node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Using prior systems and methods, it is difficult to introduce more signaling options in the MIB, for example the possibility to support CORESET #0 sizes of less than 24 RB. There is only a single reserved bit in the current standard for MIBs for future use while there may be multiple extensions needed. Accordingly, embodiments provide combinations of apparatus components and processing steps related to a set of methods, systems and apparatuses that enable NR operation to support UE with reduced bandwidths. Certain embodiments use on or more signals, for example: an SSB structure with 12-RB bandwidth; and/or an SSB configuration with 2 structures; and/or a PDCCH transmission and reception in CORESET #0 of at least 24 RBs for carrier or UE with bandwidth less than 24 RBs by restricting the valid PDCCH candidates to the subset of PDCCH candidates that are fully (entirely) contained in the carrier or UE bandwidth; and/or a CORESET #0 signal with reduced bandwidths. Thus, certain embodiments may enable NR operation to support UE with reduced bandwidths. Certain proposed embodiments may also allow proposed methods also allow an NR carrier to be deployed in a smaller spectrum allocation.

In various embodiments, new features requiring additional system information could be supported in a backwards-compatible manner.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a bandwidth operation transmitter 32 which is configured to transmit one or more of several message with structures that allow reduced bandwidth radio operation. A wireless device 22 is configured to include a bandwidth operation receiver 34 which is configured to receive one or more of several message with structures that allow reduced bandwidth radio operation.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include a monitoring unit 54 configured to enable the service provider to monitor the network node 16 and/or the wireless device 22. The processing circuitry 42 of the host computer 24 may also include a control unit 56 configured to enable the service provider to control the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include bandwidth operation transmitter 32 which is configured to transmit one or more of several messages with structures that allow reduced bandwidth radio operation.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a bandwidth operation receiver 34 which is configured to receive one or more of several message with structures that allow reduced bandwidth radio operation.

Figure 2:
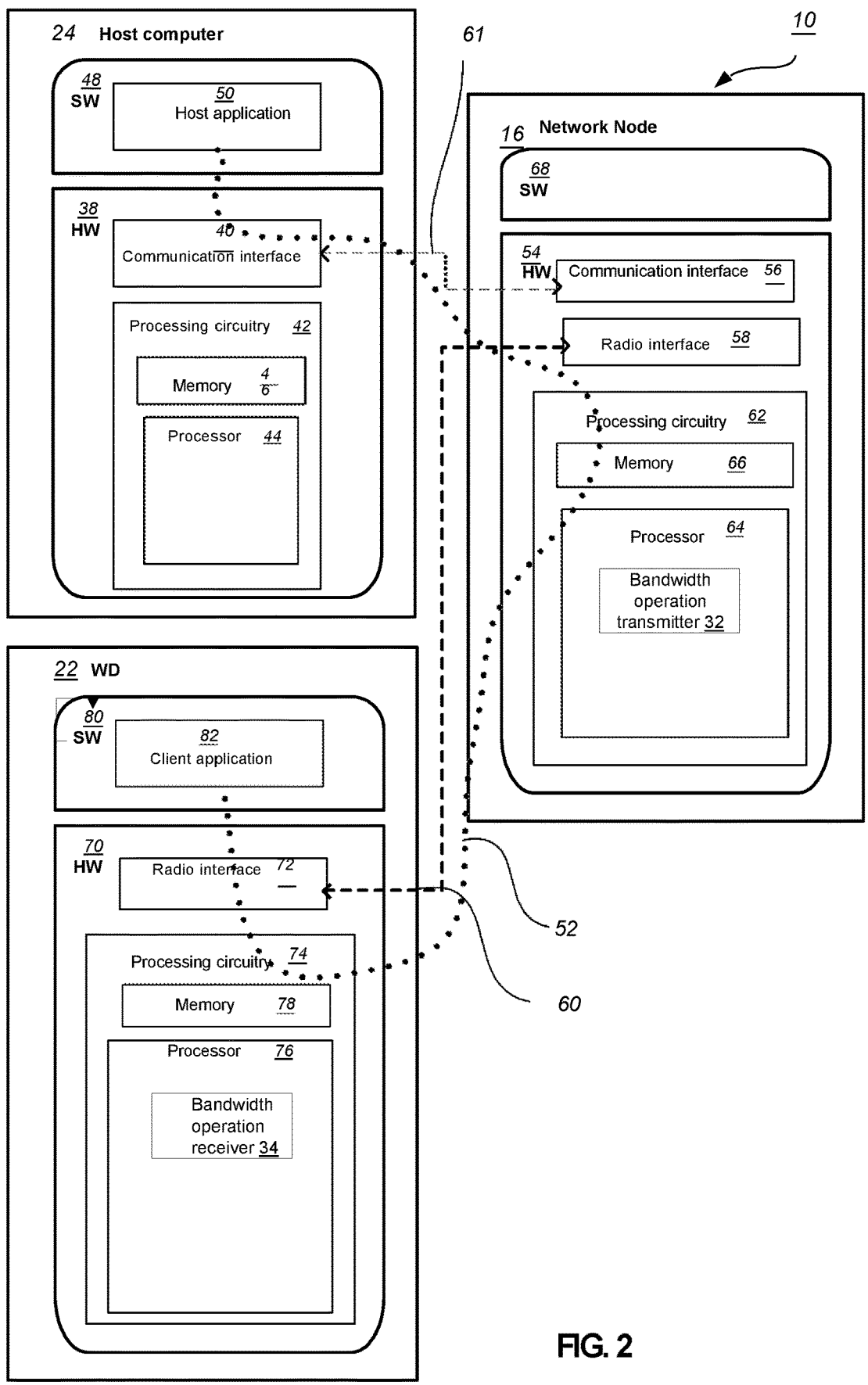
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as bandwidth operation transmitter 32, and bandwidth operation receiver 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

FIG. 7(a)-(d) are flowcharts of an exemplary process in a network node 16. One or more Blocks and/or functions performed by network node 16 may be performed by one or more elements of network node 16 such as by bandwidth operation transmitter unit 32 in processing circuitry 68, processor 70, communication interface 60, radio interface 62, etc. In one or more embodiments, network node 16 comprises a bandwidth operation transmitter transmit one or more of several messages with structures that allow reduced bandwidth radio operation.

Figure 7A:
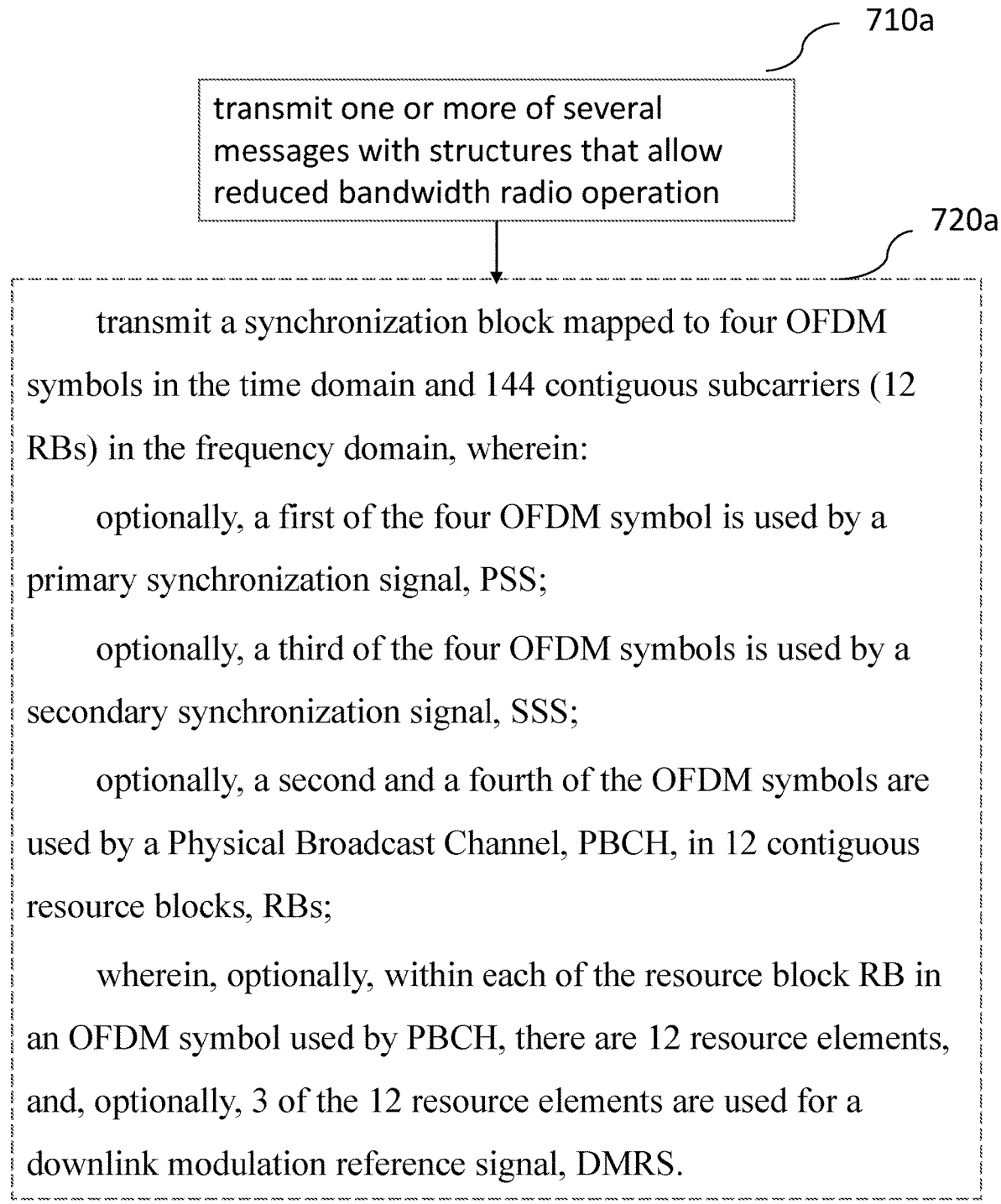
FIGS. 7(a)-(d) are flowcharts of an exemplary processes in a network node according to some embodiments of the present disclosure.

As illustrated in FIG. 7(a), in one or more embodiments, network node 16 such as via one or more of processing circuitry 68, processor 70, radio interface 62 and communication interface 60 is configured to: (step 710a) transmit one or more of several messages with structures that allow reduced bandwidth radio operation and (step 720a) perform at least one of transmit a synchronization block mapped to four OFDM symbols in the time domain and 144 contiguous subcarriers (12 RBs) in the frequency domain, wherein: optionally, a first of the four OFDM symbol is used by a primary synchronization signal, PSS; optionally, a third of the four OFDM symbols is used by a secondary synchronization signal, SSS; optionally, a second and a fourth of the OFDM symbols are used by a Physical Broadcast Channel, PBCH, in 12 contiguous resource blocks, RBs; wherein, optionally, within each of the resource block RB in an OFDM symbol used by PBCH, there are 12 resource elements, and, optionally, 3 of the 12 resource elements are used for a downlink modulation reference signal, DMRS.

Figure 7B:
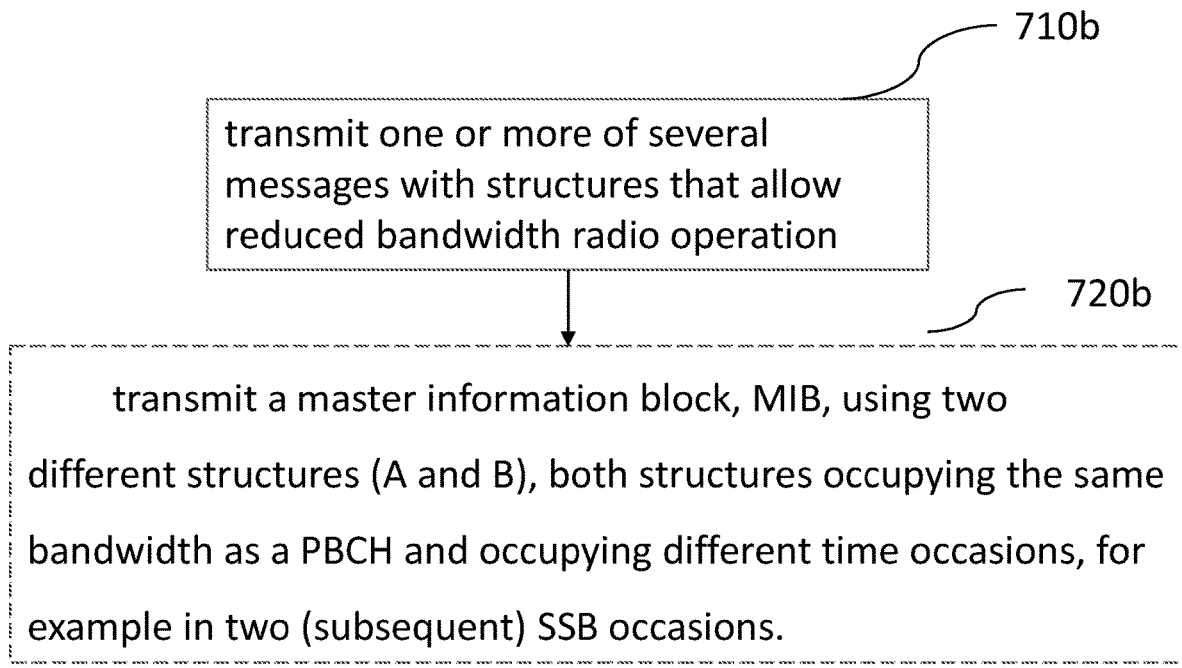

As illustrated in FIG. 7(b), in one or more embodiments, network node 16 such as via one or more of processing circuitry 68, processor 70, radio interface 62 and communication interface 60 is configured to (step 710b) transmit one or more of several messages with structures that allow reduced bandwidth radio operation and (step 720b) perform at least one of transmit a master information block, MIB, using two different structures (A and B), both structures occupying the same bandwidth as a PBCH and occupying different time occasions, for example in two (subsequent) SSB occasions.

Figure 7C:
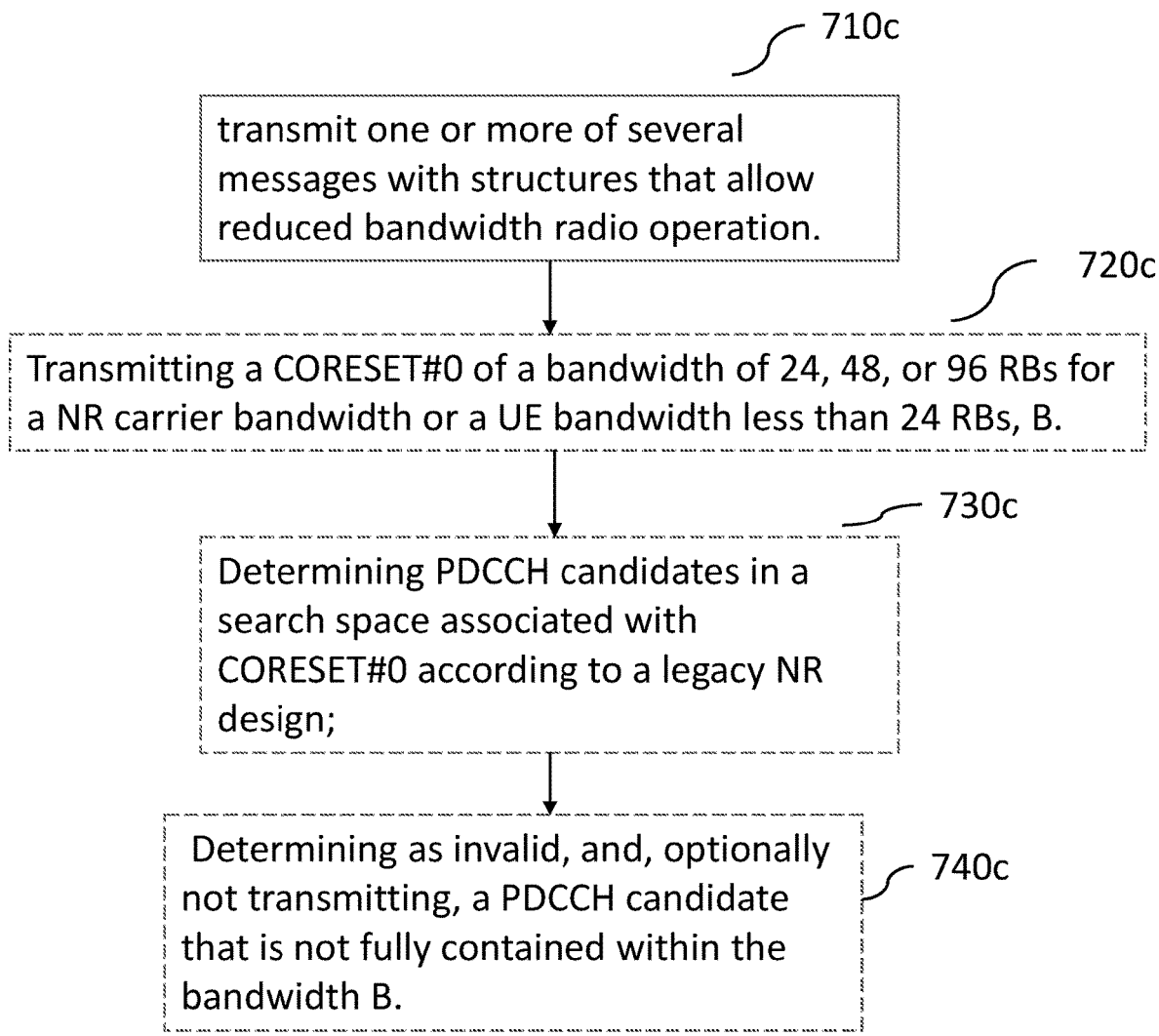

As illustrated in FIG. 7(c), in one or more embodiments, network node 16 such as via one or more of processing circuitry 68, processor 70, radio interface 62 and communication interface 60 is configured to (step 710c) transmit one or more of several messages with structures that allow reduced bandwidth radio operation and perform at least one of (step 720c) transmitting a CORESET #0 of a bandwidth of 24, 48, or 96 RBs for a NR carrier bandwidth or a UE bandwidth less than 24 RBs, B; (step 730 c) determining PDCCH candidates in a search space associated with CORESET #0 according to a legacy NR design; (step 740 c) determining as invalid, and, optionally not transmitting, a PDCCH candidate that is not fully contained within the bandwidth B.

Figure 7D:
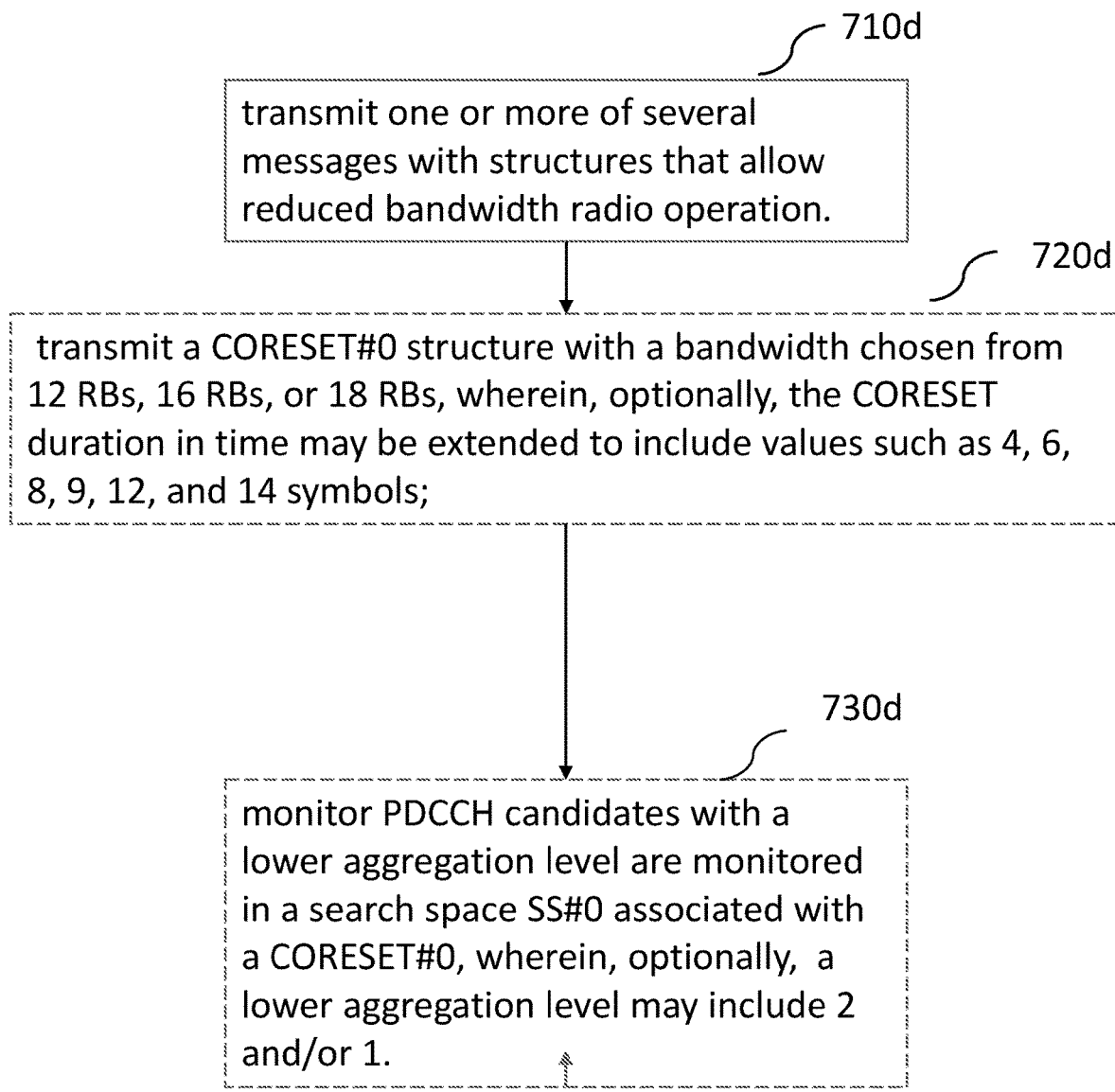

As illustrated in FIG. 7(d), in one or more embodiments, network node 16 such as via one or more of processing circuitry 68, processor 70, radio interface 62 and communication interface 60 is configured to (step 710d) transmit one or more of several messages with structures that allow reduced bandwidth radio operation and perform at least one of (step 720 d) transmit a CORESET #0 structure with a bandwidth chosen from 12 RBs, 16 RBs, or 18 RBs, wherein, optionally, the CORESET duration in time may be extended to include values such as 4, 6, 8, 9, 12, and 14 symbols; (step 730 d) monitor PDCCH candidates with a lower aggregation level are monitored in a search space SS #0 associated with a CORESET #0, wherein, optionally, a lower aggregation level may include 2 and/or 1.

FIGS. 8(a)-(d) are flowcharts of an exemplary process in a wireless device 22 according to some embodiments of the present disclosure. One or more Blocks and/or functions performed by wireless device 22 may be performed by one or more elements of wireless device 22 such as by bandwidth operation receiver 34 in processing circuitry 84, processor 86, radio interface 82, etc.

Figure 8A:
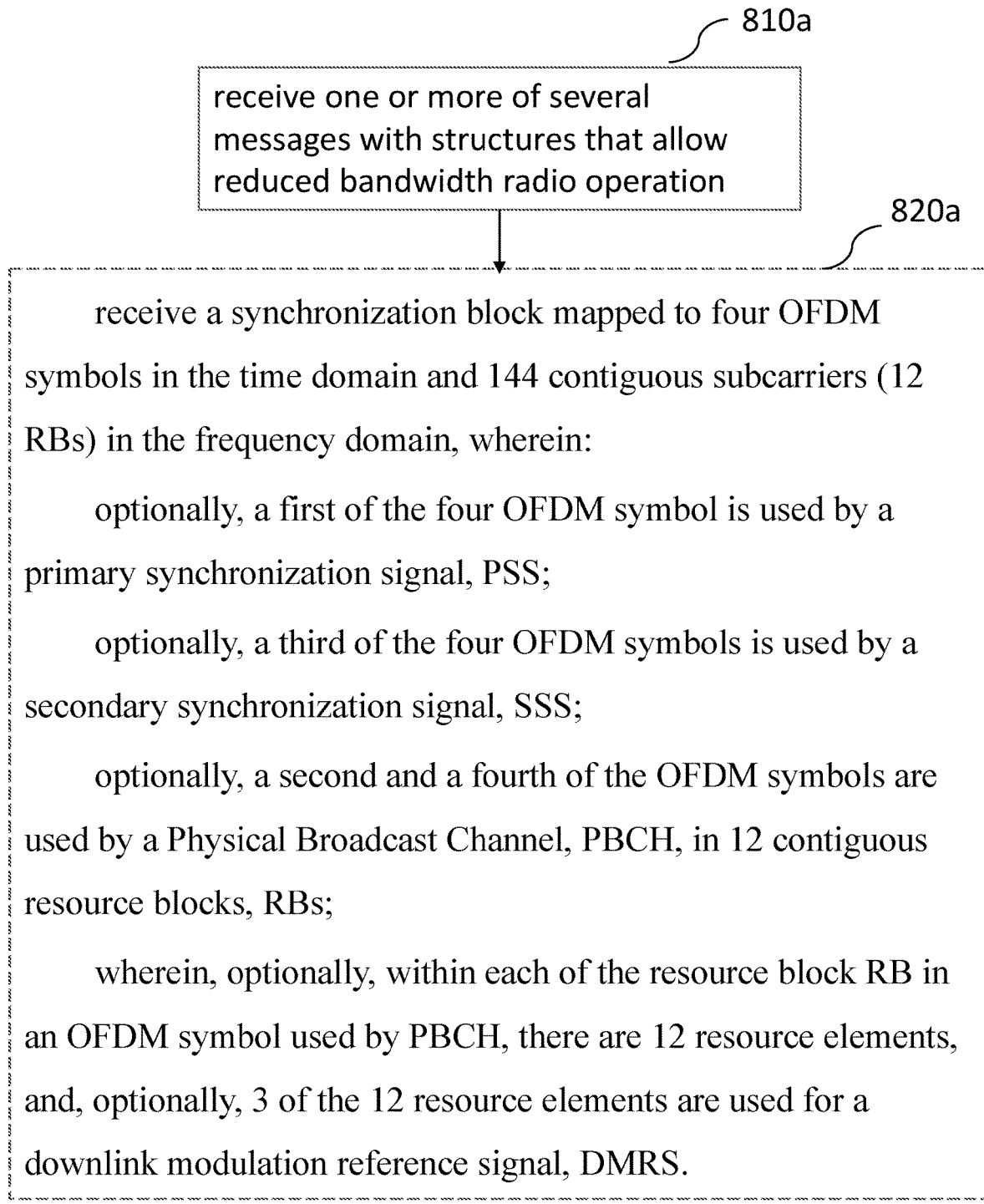
FIGS. 8(a)-(d) are flowcharts of an exemplary processes in a wireless device according to some embodiments of the present disclosure.

As illustrated in FIG. 8(a), in one or more embodiments, network node 16 such as via one or more of processing circuitry 68, processor 70, radio interface 62 and communication interface 60 is configured to (step 810a) receive one or more of several messages with structures that allow reduced bandwidth radio operation and (step 820a) perform at least one of: receive a synchronization block mapped to four OFDM symbols in the time domain and 144 contiguous subcarriers (12 RBs) in the frequency domain, wherein: optionally, a first of the four OFDM symbol is used by a primary synchronization signal, PSS; optionally, a third of the four OFDM symbols is used by a secondary synchronization signal, SSS; optionally, a second and a fourth of the OFDM symbols are used by a Physical Broadcast Channel, PBCH, in 12 contiguous resource blocks, RBs; wherein, optionally, within each of the resource block RB in an OFDM symbol used by PBCH, there are 12 resource elements, and, optionally, 3 of the 12 resource elements are used for a downlink modulation reference signal, DMRS.

Figure 8B:
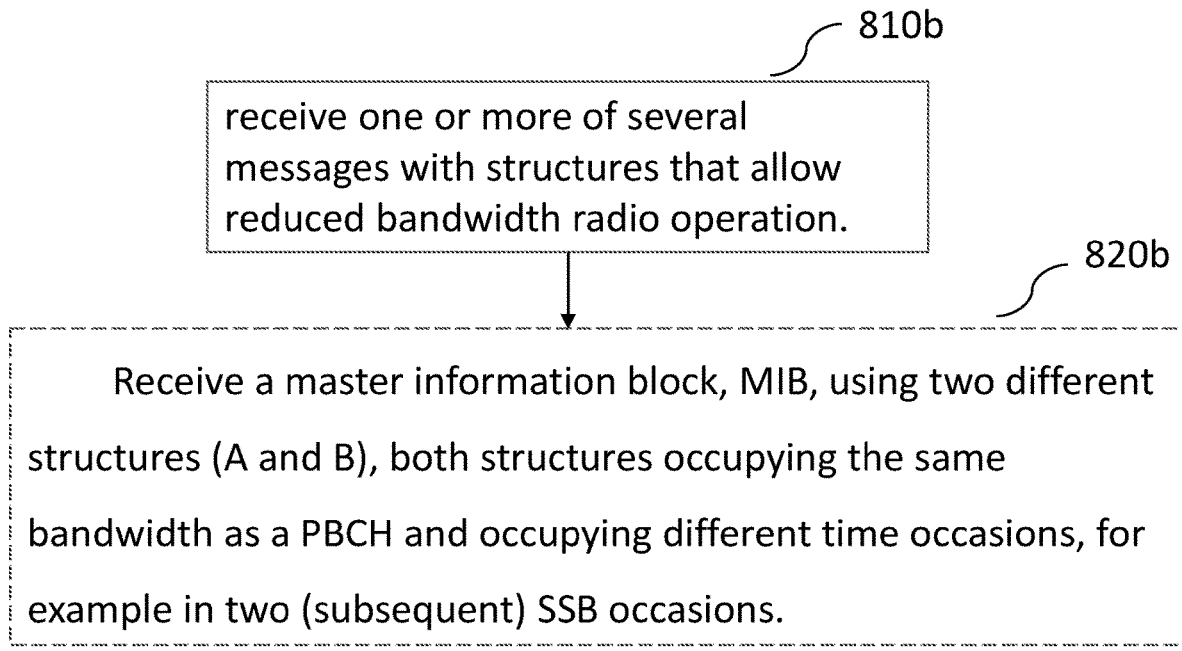

As illustrated in FIG. 8(b), in one or more embodiments, network node 16 such as via one or more of processing circuitry 68, processor 70, radio interface 62 and communication interface 60 is configured to (step 810b) receive one or more of several messages with structures that allow reduced bandwidth radio operation and (820b) perform at least one of receive a master information block, MIB, using two different structures (A and B), both structures occupying the same bandwidth as a PBCH and occupying different time occasions, for example in two (subsequent) SSB occasions.

Figure 8C:
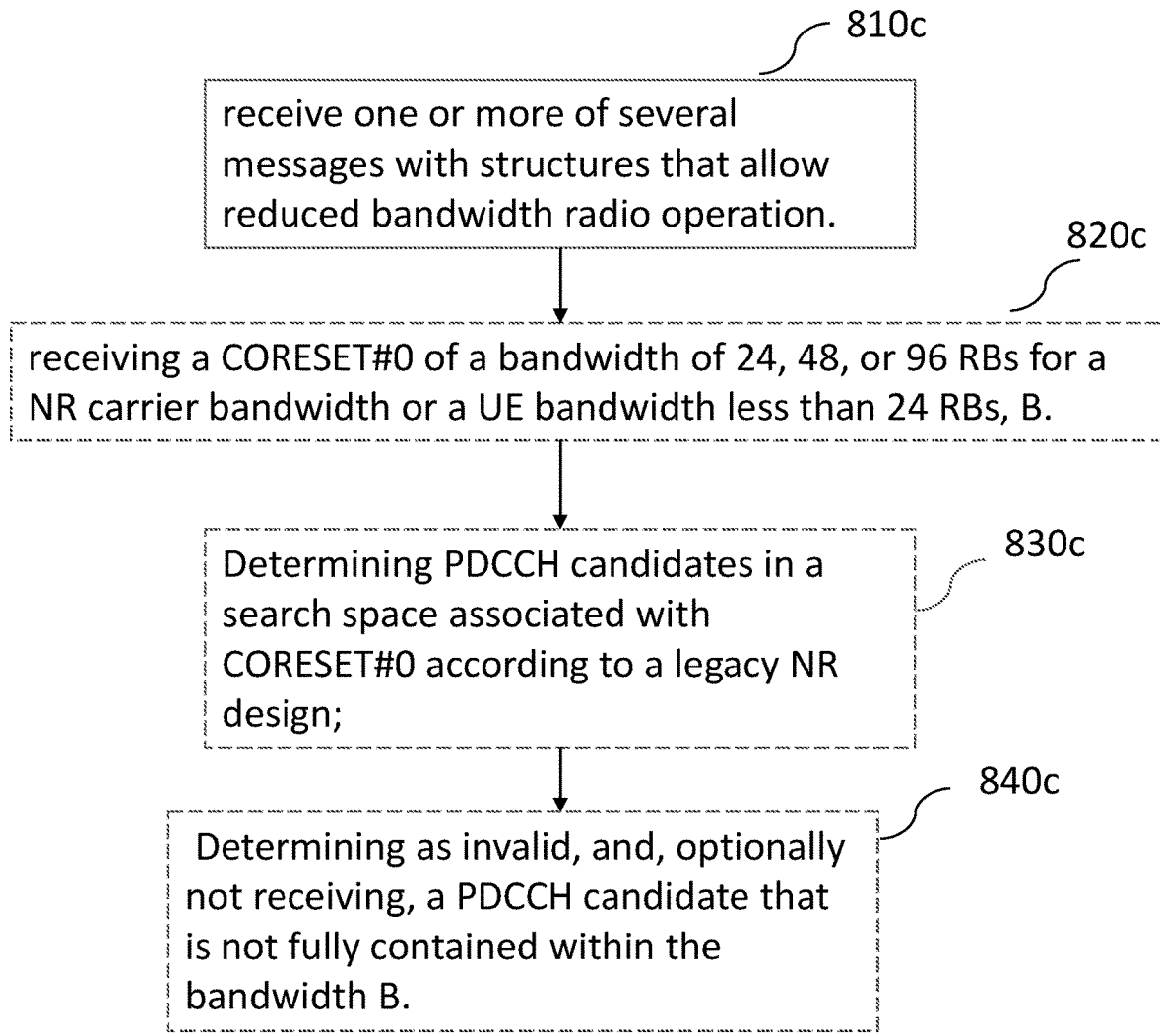

As illustrated in FIG. 8(c), in one or more embodiments, network node 16 such as via one or more of processing circuitry 68, processor 70, radio interface 62 and communication interface 60 is configured to (step 810c) receive one or more of several messages with structures that allow reduced bandwidth radio operation and perform at least one of (step 820c) receiving a CORESET #0 of a bandwidth of 24, 48, or 96 RBs for a NR carrier bandwidth or a UE bandwidth less than 24 RBs, B; (step 830c) determining PDCCH candidates in a search space associated with CORESET #0 according to a legacy NR design; (step 840c) determining as invalid, and, optionally not transmitting, a PDCCH candidate that is not fully contained within the bandwidth B.

Figure 8D:
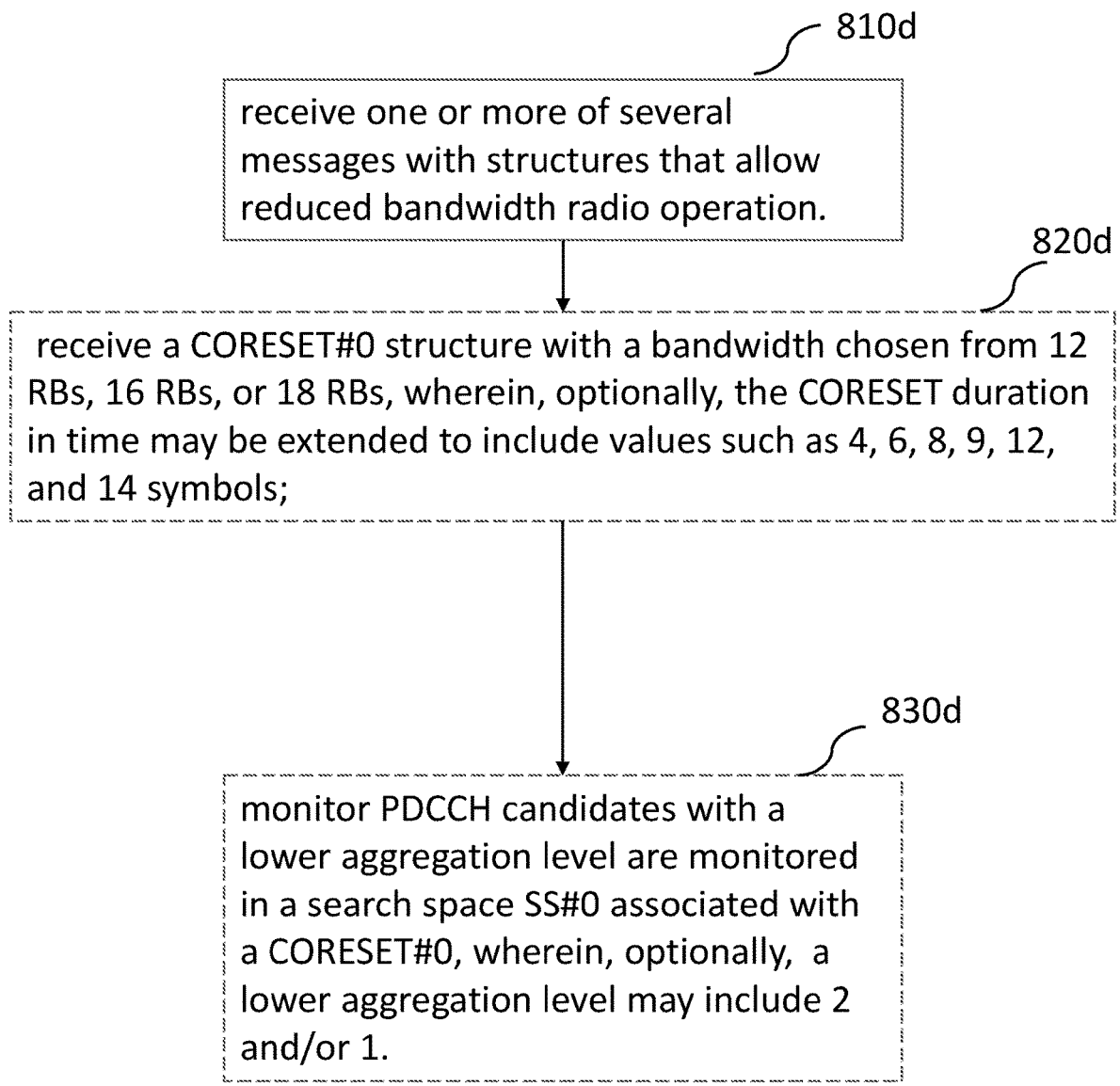

As illustrated in FIG. 8(d), in one or more embodiments, network node 16 such as via one or more of processing circuitry 68, processor 70, radio interface 62 and communication interface 60 is configured to (step 810d) receive one or more of several messages with structures that allow reduced bandwidth radio operation and perform at least one of: (step 820d) receive a CORESET #0 structure with a bandwidth chosen from 12 RBs, 16 RBs, or 18 RBs, wherein, optionally, the CORESET duration in time may be extended to include values such as 4, 6, 8, 9, 12, and 14 symbols and (step 830d) monitor PDCCH candidates with a lower aggregation level are monitored in a search space SS #0 associated with a CORESET #0, wherein, optionally, a lower aggregation level may include 2 and/or 1.

Having described the general process flow of arrangements of the disclosure and having provided examples of hardware and software arrangements for implementing the processes and functions of the disclosure, the sections below provide details and examples of arrangements for reducing radio bandwidth operation.

Embodiments provide for radio operation with reduced bandwidth.

Embodiment A: Synchronization and PBCH block (SSB) structure with reduced bandwidth In this embodiment, a SSB structure is presented as follows.

An SSB is mapped to 4 OFDM symbols in the time domain and 144 contiguous subcarriers (12 RBs) in the frequency domain.

The first OFDM symbol is used by PSS, which has the same structure as existing NR PSS that occupies 127 subcarriers The third OFDM symbol is used by SSS, which has the same structure as existing NR SSS that occupies 127 subcarriers PBCH uses the second and the fourth OFDM symbols in 12 contiguous RBs. Within each RB in an OFDM symbol used by PBCH, there are 12 resource elements, in which 3 resource elements are used for DMRS. This leaves 9 resource elements per PBCH RB in an OFDM symbol for mapping the PBCH symbols.

In one variant of embodiment A, a different codeword than the existing Rel-15 PBCH codeword is generated. The new codeword naturally maps to 12×9×2=216 resource elements of the second and the fourth OFDM symbols. The new codeword may be a truncated version of the existing Rel-15 PBCH codeword.

In a 2nd variant of embodiment A, the existing Rel-15 PBCH codeword is used. The existing PBCH codeword generates 432 QPSK symbols: 180 QPSK symbols are mapped to the 20 contiguous RBs of the 2nd OFDM symbol, 180 QPSK symbols are mapped to the 20 contiguous RBs of the 4th OFDM symbol, and the remaining 72 symbols are mapped to the 4 RBs each above and below the RBs used for SSS in the 3rd OFDM symbol. However, since the bandwidth reduced WD 22 can only receive 12 contiguous RBs, there are 8×9=72 QPSK symbols in each of the 2nd and 4th OFDM symbols not received by the WD 22. Furthermore, the 4 RBs above and below the SSS RBs cannot be received by the WD 22, and there are 2×4×9=72 QPSK symbols in these RBs. Thus, in total there are 72+72+72=216 QPSK symbols that cannot be received by WD 22s only capable of receiving 12 contiguous RBs. According to the 2nd variant of embodiment 2, the existing NR PBCH symbols outside of the 12 contiguous RBs mentioned above are remapped to other OFDM symbols. For example, they can be re-mapped to the 5th and 6th OFDM symbols.

Figure 9:
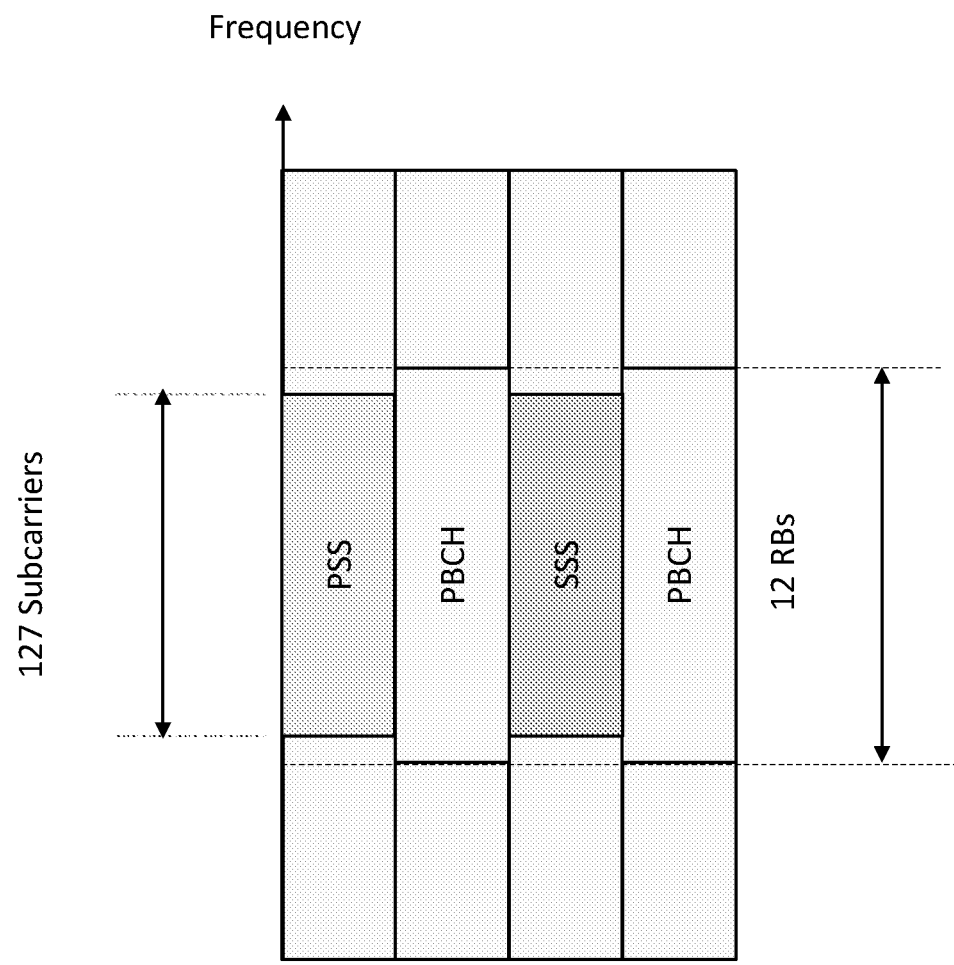
FIG. 9. Illustrates an SSB design with reduced bandwidth according to some embodiments of the present disclosure.

This design illustrated in FIG. 9 would reduce the existing SSB bandwidth of 20 RBs to a new SSB bandwidth of 12 RBs.

In another embodiment, if the new SSB is intended to be only acquired by certain WD 22s such as WD 22 with reduced bandwidths and should not be acquired by other WD 22s, one or more of the followings can be applied:

New sequences for PSS and/or SSS

Scramble existing sequences of PSS and/or SSS by pseudo-random sequences

Scramble coded bits of PBCH with a different pseudo-random sequence and apply existing PBCH mapping by puncturing the resource elements outside the 12-RB bandwidth Interleave the coded bits of PBCH with a different pattern and apply existing PBCH mapping by puncturing the resource elements outside the 12-RB bandwidth Apply new PBCH mapping where the coded bits are only mapped to the available resource elements for PBCH in the new SSB (i.e., the 108 resource elements in the second symbol and the 108 resource elements in the fourth symbol)

Use a new PBCH mapping known only to new WD 22s where the PBCH occupies several OFDM symbols (as many as needed) using a different set of OFDM symbols than the current SSB, e.g. X symbols following the SSB, X symbols in the next slot, etc. A narrow-band WD 22 reads only the narrow PBCH; A wideband WD 22 may read the narrow PBCH if necessary (e.g. for coverage enhancement, faster MIB acquisition, etc.). The benefit of this scheme is same PSS/SSS for legacy and narrow WD 22s but they may read different PBCH (where the "narrow" PBCH can use different scrambling etc).

To facilitate PSS detection at the WD 22, the network may choose not to transmit signals in adjacent RB(s) of the symbol used by the PSS.

Embodiment B: Different SSB structure exploitable by both new and legacy UEs

In this embodiment the MIB is transmitted using two different structures (A and B), both occupying the same bandwidth as the current PBCH but using different occasions in time, for example in two (subsequent) SSB occasions:

Structure A uses the NR Rel-15 mapping of the PBCH. Any WD 22 capable of receiving the full SSB bandwidth can acquire the MIB, while a narrowband UE 22 (supporting at least the PSS/SSS bandwidth) can only receive parts of the PBCH (the bits that happen to be located within the narrow bandwidth).

Structure B uses the same SSB structure as in Rel-15 except that the PBCH mapping is changed such that the bits mapped outside the PSS/SSS bandwidth in the first occasion are now mapped within the PSS/SSS bandwidth (and vice versa). Some bits may be receivable only in either the first or second occasion, some will be receivable in both occasions. Preferably a different scrambling sequence (or some other means as outlined in embodiment A) is used to avoid a legacy Rel-15 UE 22 to detect the second occasion.

Figure 10:
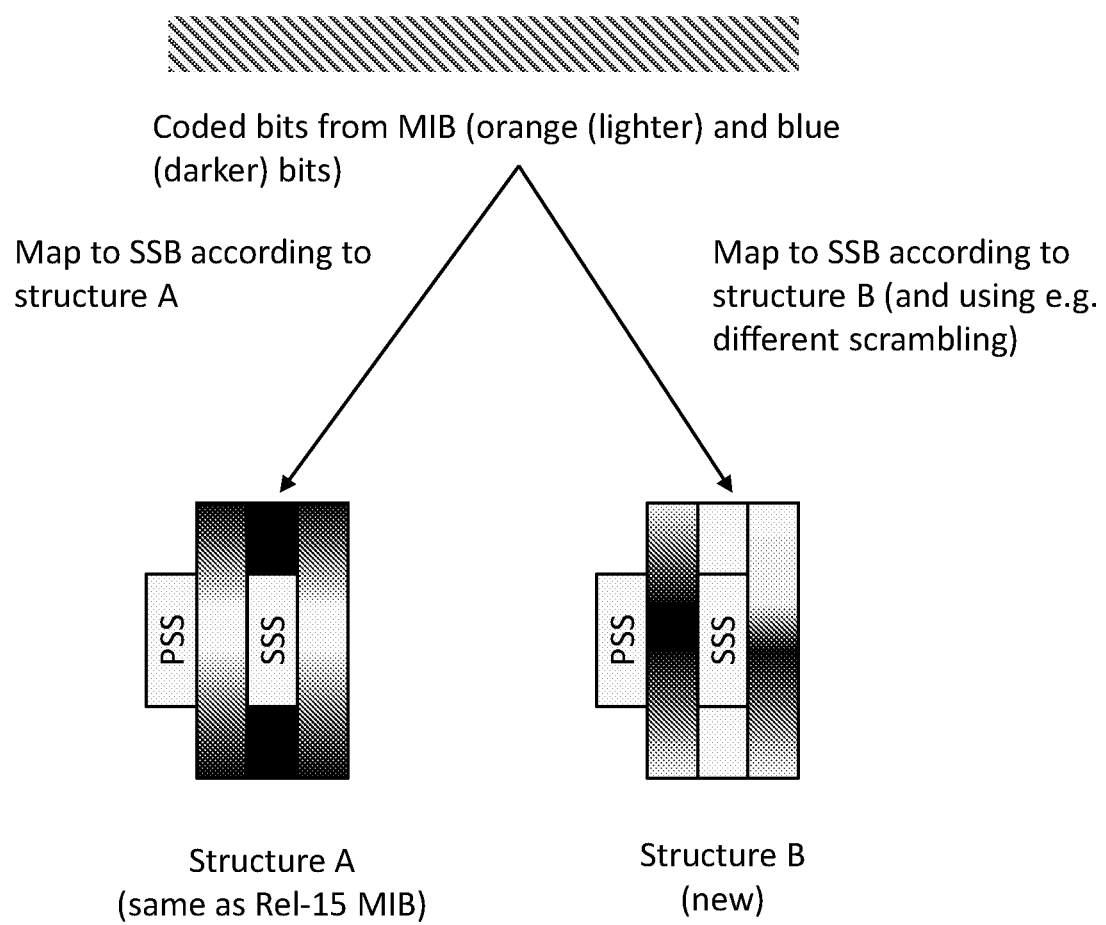
FIG. 10. illustrates an SSB design with two structures according to some embodiments of the present disclosure.

The design is illustrated in FIG. 10. This structure implies that:

A Rel-15 UE 22 can obtain the MIB by receiving structure A, as it only understands structure A.

A narrowband UE22 can obtain the MIB by receiving structure A and B and combine the two before decoding.

A "new" wideband UE 22 aware of the two structures can obtain the MIB using either of structure A or B. The UE 22 can receive all coded bits in either structure A or B but needs to blindly detect whether it is structure A or B.

Embodiment C: PDCCH transmission and reception in CORESET #0 of at least 24 RBs for NR carrier bandwidth or WD 22 bandwidth less than 24 RBs.

In this embodiment, CORESET #0 of existing bandwidth (24, 48, or 96 RBs) is used for NR carrier bandwidth or WD 22 bandwidth less than 24 RBs, denoted as B. PDCCH candidates in a search space associated with CORESET #0 are determined according to the existing NR design. But a PDCCH candidate that is not fully contained within the bandwidth B is considered invalid. In other words, the network transmits PDCCH by only using the valid PDCCH candidates in the search space associated with CORESET #0, and the WD 22 is only required to monitor the valid PDCCH candidates in the search space associated with CORESET #0.

With this embodiment, future narrow-band WD 22s can share the SSB with existing, legacy WD 22s. Once the WD 22 has connected to the network, additional CORESETs can be configured with a suitable bandwidth. Furthermore, a narrow-band WD 22 needs to support at least the bandwidth of the SSB (20 RB) in this embodiment if the narrow-band WD 22 shares the SSB with existing, legacy WD 22s.

Embodiment D: Different (than legacy) 'CORESET #0' (the signal could have a different name) with reduced bandwidth.

In this embodiment, the following different (than legacy) 'CORESET #0' structure is used. The possible bandwidth includes 12 RBs, 16 RBs, or 18 RBs. Also, PDCCH candidates with lower aggregation level are monitored in SS #0 associated with CORESET #0. The lower aggregation levels include 2 and 1. The CORESET duration in time may be extended to include new values such as 4, 6, 8, 9, 12, and 14 symbols.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

Embodiment A0: A network node comprising a bandwidth operation transmitter configured to transmit one or more of several messages with structures that allow reduced bandwidth radio operation.

Embodiment A1. A network node configured to, and/or comprising a radio interface and/or comprising processing circuitry configured to transmit a synchronization block mapped to four OFDM symbols in the time domain and 144 contiguous subcarriers (12 RBs) in the frequency domain, wherein:
  optionally, a first of the four OFDM symbol is used by a primary synchronization signal, PSS;
  optionally, a third of the four OFDM symbols is used by a secondary synchronization signal, SSS;
  optionally, a second and a fourth of the OFDM symbols are used by a Physical Broadcast Channel, PBCH, in 12 contiguous resource blocks, RBs;
  wherein, optionally, within each of the resource block RB in an OFDM symbol used by PBCH, there are 12 resource elements, and, optionally, 3 of the 12 resource elements are used for a downlink modulation reference signal, DMRS.

Embodiment A2. A network node configured to, and/or comprising a radio interface and/or comprising processing circuitry configured to transmit a master information block, MIB, using two different structures (A and B), both structures occupying the same bandwidth as a PBCH and occupying different time occasions, for example in two (subsequent) SSB occasions.

Embodiment A3. A network node configured to, and/or comprising a radio interface and/or comprising processing circuitry configured to, at least one of:
  transmitting a CORESET #0 of a bandwidth of 24, 48, or 96 RBs for a NR carrier bandwidth or a UE bandwidth less than 24 RBs, B.
  determining PDCCH candidates in a search space associated with CORESET #0 according to a legacy NR design;
  determining as invalid, and, optionally not transmitting, a PDCCH candidate that is not fully contained within the bandwidth B.

Embodiment A4. A network node, configured to, and/or comprising a radio interface and/or comprising processing circuitry configured to, at least one of:
  transmit a CORESET #0 structure with a bandwidth chosen from 12 RBs, 16 RBs, or 18 RBs, wherein, optionally, the CORESET duration in time may be extended to include values such as 4, 6, 8, 9, 12, and 14 symbols;
  monitor PDCCH candidates with a lower aggregation level are monitored in a search space SS #0 associated with a CORESET #0, wherein, optionally, a lower aggregation level may include 2 and/or 1.

Embodiment B0: A method for a network node comprising transmitting one or more of several messages with structures that allow reduced bandwidth radio operation.

Embodiment B1. A method for a network node comprising transmitting a synchronization block mapped to four OFDM symbols in the time domain and 144 contiguous subcarriers (12 RBs) in the frequency domain, wherein:
  optionally, a first of the four OFDM symbol is used by a primary synchronization signal, PSS;
  optionally, a third of the four OFDM symbols is used by a secondary synchronization signal, SSS;
  optionally, a second and a fourth of the OFDM symbols are used by a Physical Broadcast Channel, PBCH, in 12 contiguous resource blocks, RBs;
  wherein, optionally, within each of the resource block RB in an OFDM symbol used by PBCH, there are 12 resource elements, and, optionally, 3 of the 12 resource elements are used for a downlink modulation reference signal, DMRS.

Embodiment B2. A method for a network node comprising transmitting a master information block, MIB, using two different structures (A and B), both structures occupying the same bandwidth as a PBCH and occupying different time occasions, for example in two (subsequent) SSB occasions.

Embodiment B3. A method for a network node comprising at least one of:

transmitting a CORESET #0 of a bandwidth of 24, 48, or 96 RBs for a NR carrier bandwidth or a UE bandwidth less than 24 RBs, B. determining PDCCH candidates in a search space associated with CORESET #0 according to a legacy NR design;

determining as invalid, and, optionally not transmitting, a PDCCH candidate that is not fully contained within the bandwidth B.

Embodiment B4. A method for a network node comprising at least one of:

transmit a CORESET #0 structure with a bandwidth chosen from 12 RBs, 16 RBs, or 18 RBs, wherein, optionally, the CORESET duration in time may be extended to include values such as 4, 6, 8, 9, 12, and 14 symbols;

monitor PDCCH candidates with a lower aggregation level are monitored in a search space SS #0 associated with a CORESET #0, wherein, optionally, a lower aggregation level may include 2 and/or 1.

Embodiment C0. A wireless device, comprising a bandwidth operation receiver configured to receive one or more of several messages with structures that allow reduced bandwidth radio operation.

Embodiment C1. A wireless device, configured to, and/or comprising a radio interface and/or comprising processing circuitry configured to receive a synchronization block mapped to four OFDM symbols in the time domain and 144 contiguous subcarriers (12 RBs) in the frequency domain, wherein: optionally, a first of the four OFDM symbol is used by a primary synchronization signal, PSS;

optionally, a third of the four OFDM symbols is used by a secondary synchronization signal, SSS;

optionally, a second and a fourth of the OFDM symbols are used by a Physical Broadcast Channel, PBCH, in 12 contiguous resource blocks, RBs;

wherein, optionally, within each of the resource block RB in an OFDM symbol used by PBCH, there are 12 resource elements, and, optionally, 3 of the 12 resource elements are used for a downlink modulation reference signal, DMRS.

Embodiment C2. A wireless device, configured to, and/or comprising a radio interface and/or comprising processing circuitry configured to receive a master information block, MIB, using two different structures (A and B), both structures occupying the same bandwidth as a PBCH and occupying different time occasions, for example in two (subsequent) SSB occasions.

Embodiment C3. A wireless device, configured to, and/or comprising a radio interface and/or comprising processing circuitry configured to, at least one of: receive ting a CORESET #0 of a bandwidth of 24, 48, or 96 RBs for a NR carrier bandwidth or a UE bandwidth less than 24 RBs, B.

determining PDCCH candidates in a search space associated with CORESET #0 according to a legacy NR design;

determining as invalid, and, optionally not receive ting, a PDCCH candidate that is not fully contained within the bandwidth B.

Embodiment C4. A wireless device, configured to, and/or comprising a radio interface and/or comprising processing circuitry configured to, at least one of:

receive a CORESET #0 structure with a bandwidth chosen from 12 RBs, 16 RBs, or 18 RBs, wherein, optionally, the CORESET duration in time may be extended to include values such as 4, 6, 8, 9, 12, and 14 symbols;

monitor PDCCH candidates with a lower aggregation level are monitored in a search space SS #0 associated with a CORESET #0, wherein, optionally, a lower aggregation level may include 2 and/or 1.

Embodiment D0. A method for a wireless device comprising receiving one or more of several messages with structures that allow reduced bandwidth radio operation.

Embodiment D1. A method for a wireless device comprising receiving a synchronization block mapped to four OFDM symbols in the time domain and 144 contiguous subcarriers (12 RBs) in the frequency domain, wherein:

optionally, a first of the four OFDM symbol is used by a primary synchronization signal, PSS;

optionally, a third of the four OFDM symbols is used by a secondary synchronization signal, SSS;

optionally, a second and a fourth of the OFDM symbols are used by a Physical Broadcast Channel, PBCH, in 12 contiguous resource blocks, RBs;

wherein, optionally, within each of the resource block RB in an OFDM symbol used by PBCH, there are 12 resource elements, and, optionally, 3 of the 12 resource elements are used for a downlink modulation reference signal, DMRS.

Embodiment D2. A method for a wireless device comprising receiving a master information block, MIB, using two different structures (A and B), both structures occupying the same bandwidth as a PBCH and occupying different time occasions, for example in two (subsequent) SSB occasions.

Embodiment D3. A method for a wireless device comprising at least one of:

receiving a CORESET #0 of a bandwidth of 24, 48, or 96 RBs for a NR carrier bandwidth or a UE bandwidth less than 24 RBs, B. determining PDCCH candidates in a search space associated with CORESET #0 according to a legacy NR design;

determining as invalid, and, optionally not receiving, a PDCCH candidate that is not fully contained within the bandwidth B.

Embodiment D4. A method for a wireless device comprising at least one of:

transmit a CORESET #0 structure with a bandwidth chosen from 12 RBs, 16 RBs, or 18 RBs, wherein, optionally, the CORESET duration in time may be extended to include values such as 4, 6, 8, 9, 12, and 14 symbols;

monitor PDCCH candidates with a lower aggregation level are monitored in a search space SS #0 associated with a CORESET #0, wherein, optionally, a lower aggregation level may include 2 and/or 1.

REFERENCES (INCORPORATED HERE BY REFERENCE)

[1] TS 38.211, Section 7.4.3—SS/PBCH block
[2] TS 38.213, Section 13—UE procedure for monitoring Type0-PDCCH CSS sets
[3] www.rfwireless-world.com/Articles/5G-NR-Physical-Layer.html
[4] www.rfwireless-world.com/Articles/5G-NR-Physical-Layer.html 5G NR Physical layer|Physical layer as per 5G NR New Radio
[5] www.sharetechnote.com-5G/NR—MIB/SIB
[6] www.sharetechnote.com-5G/NR—Frame Structure At least some of the following abbreviations may be used in this disclosure. If there is an inconsistency between abbreviations, preference should be given to how it is used above. If listed multiple times below, the first listing should be preferred over any subsequent listing(s).

5G 5th Generation
CORESET Control Resource Set
FR1 Frequency Range 1
FR2 Frequency Range 2
IOT Internet of Things
MIB Master Information Block
NR New Radio
OFDM Orthogonal Frequency-Division Multiplexing
PBCH Physical Broadcast Channel
PDCCH Physical Downlink Control Channel
PSS Primary Synchronization Signal
QPSK Quadrature Phase Shift Keying
RB Resource Block
SIB1 System Information Block 1
SS Search Space
SSB Synchronization Signals and physical proadcast channel Block
SSS Secondary Synchronization Signal
UE User Equipment
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Those skilled in the art will recognize improvements and modifications to the embodiments of the present disclosure. All such improvements and modifications are considered within the scope of the concepts disclosed herein.

The invention claimed is:

1. A network node configured to:
transmit a synchronization block mapped to six orthogonal frequency division multiplexed (OFDM) symbols in the time domain and 144 contiguous subcarriers in 12 resource blocks (RBs) in the frequency domain:
a first symbol of the six OFDM symbol being used by a primary synchronization signal (PSS);
a third symbol of the six OFDM symbols being used by a secondary synchronization signal (SSS);
a second and a fourth symbol of the six OFDM symbols being used by a Physical Broadcast Channel (PBCH) in 12 contiguous RBs; and
a fifth and a sixth symbol of the six OFDM symbols being remapped from PBCH symbols outside of the 12 contiguous RBs.

2. The network node of claim 1, wherein the network node is configured to transmit a master information block (MIB) on the PBCH using two different structures (A and B), both structures occupying a same bandwidth as the PBCH and occupying different time occasions.

3. A wireless device, configured to:
receive a synchronization block mapped to six orthogonal frequency division multiplexed (OFDM) symbols in the time domain and 144 contiguous subcarriers in 12 resource blocks (RBs) in the frequency domain:
a first symbol of the six OFDM symbol being used by a primary synchronization signal (PSS);
a third symbol of the six OFDM symbols being used by a secondary synchronization signal (SSS);
a second and a fourth symbol of the six OFDM symbols being used by a Physical Broadcast Channel (PBCH) in 12 contiguous RBs; and
a fifth and a sixth symbol of the OFDM symbols being remapped from PBCH symbols outside of the 12 contiguous RBs.

\* \* \* \* \*